Dec. 7, 1937.  C. I. HAYES  2,101,065
HEAT TREATMENT FURNACE
Filed March 28, 1935  6 Sheets-Sheet 1
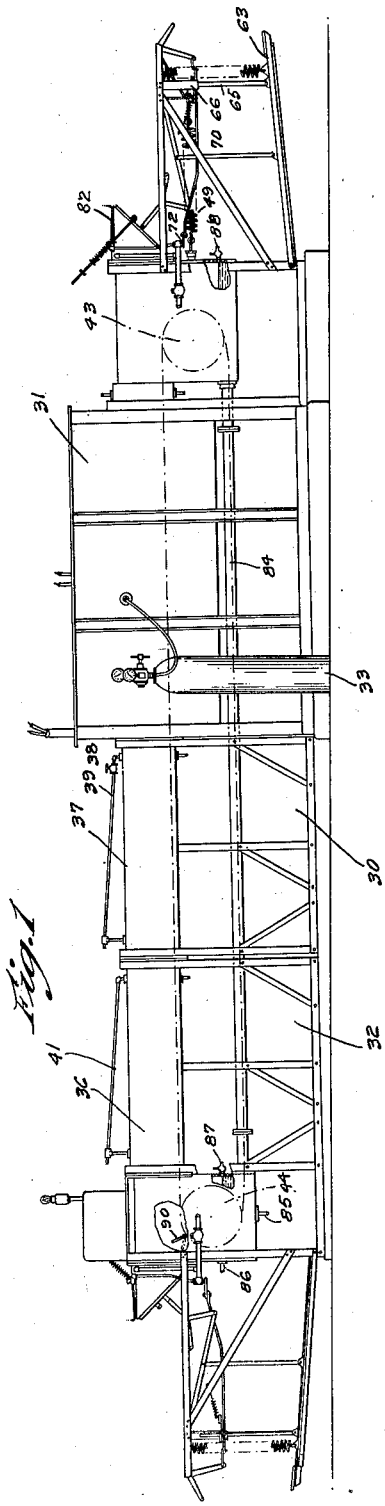
Inventor
Carl I. Hayes
By Nathaniel Frucht
Attorney Dec. 7, 1937.                  C. I. HAYES                    2,101,065
                        HEAT TREATMENT FURNACE
                        Filed March 28, 1935        6 Sheets-Sheet 2
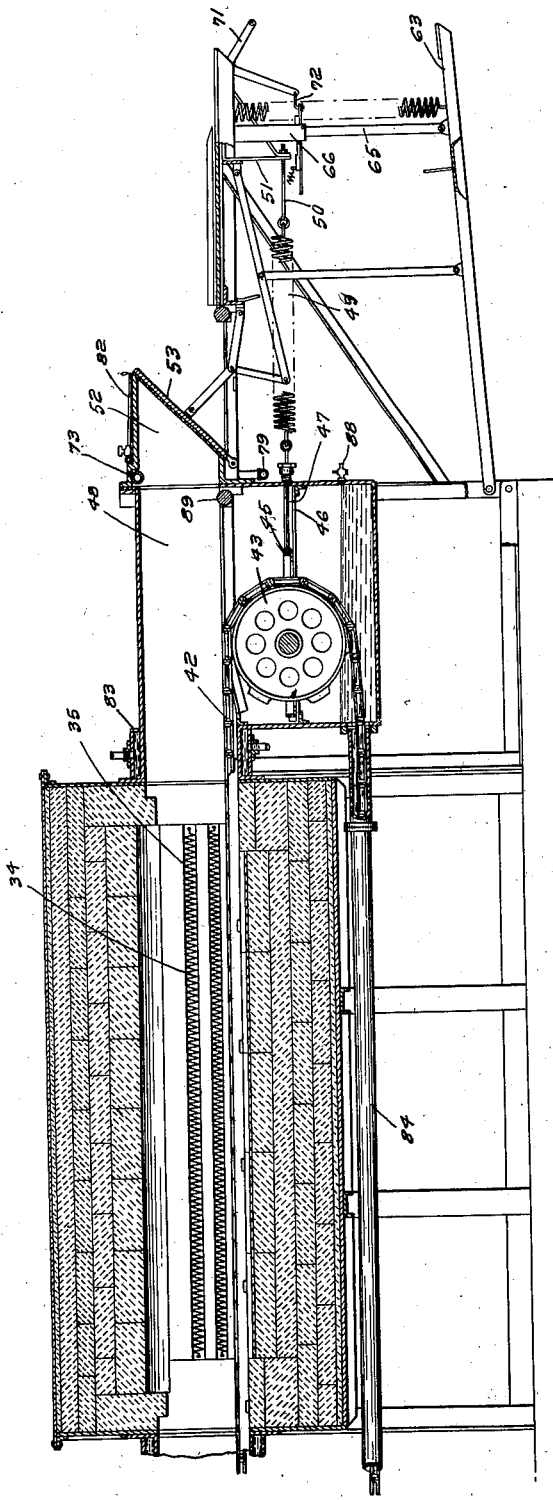
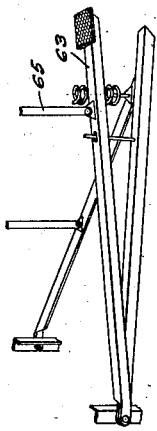
Inventor
Carl I. Hayes
By Nathaniel Frucht
      Attorney

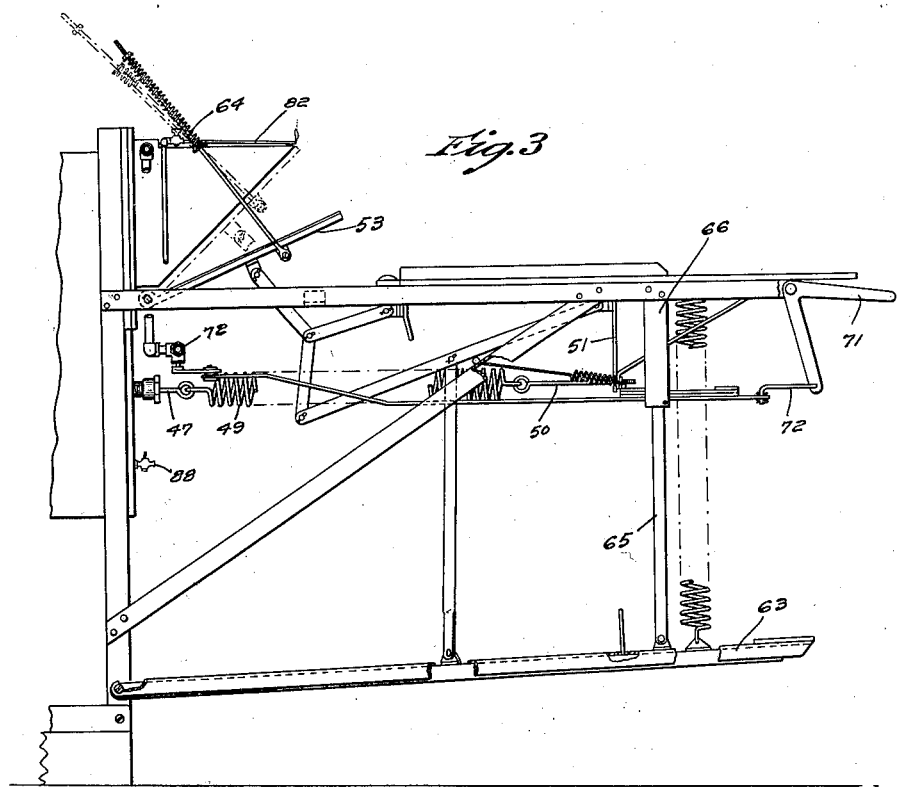
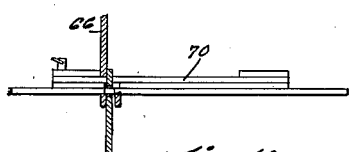
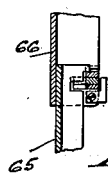
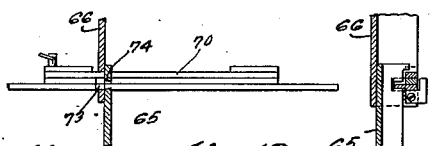
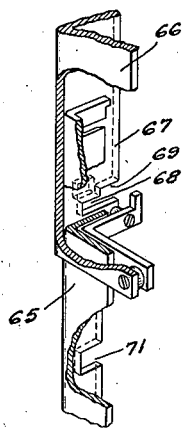

Dec. 7, 1937.   C. I. HAYES   2,101,065
HEAT TREATMENT FURNACE
Filed March 28, 1935   6 Sheets-Sheet 4

Inventor
Carl I. Hayes
By Nathaniel Frucht
Attorney

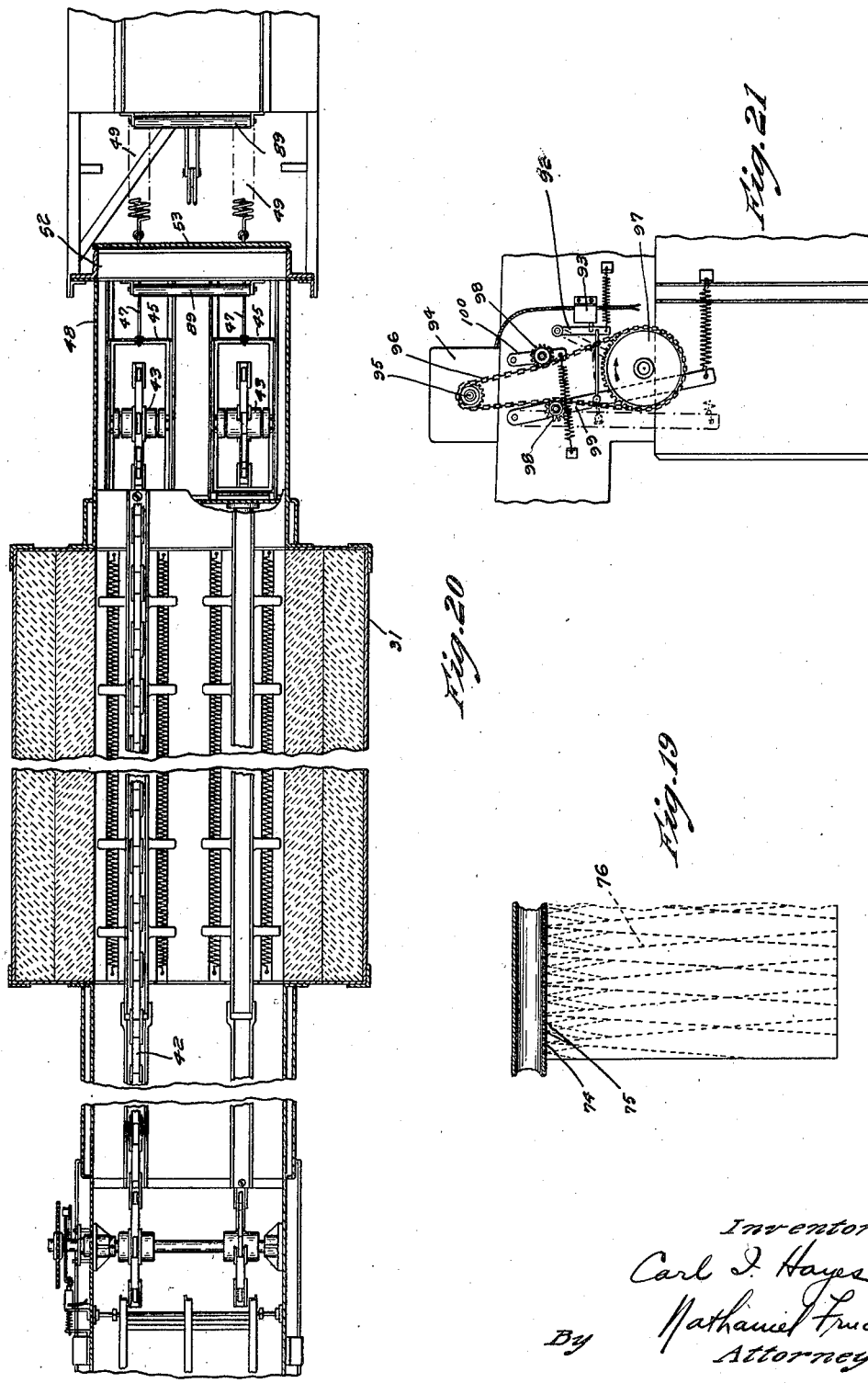

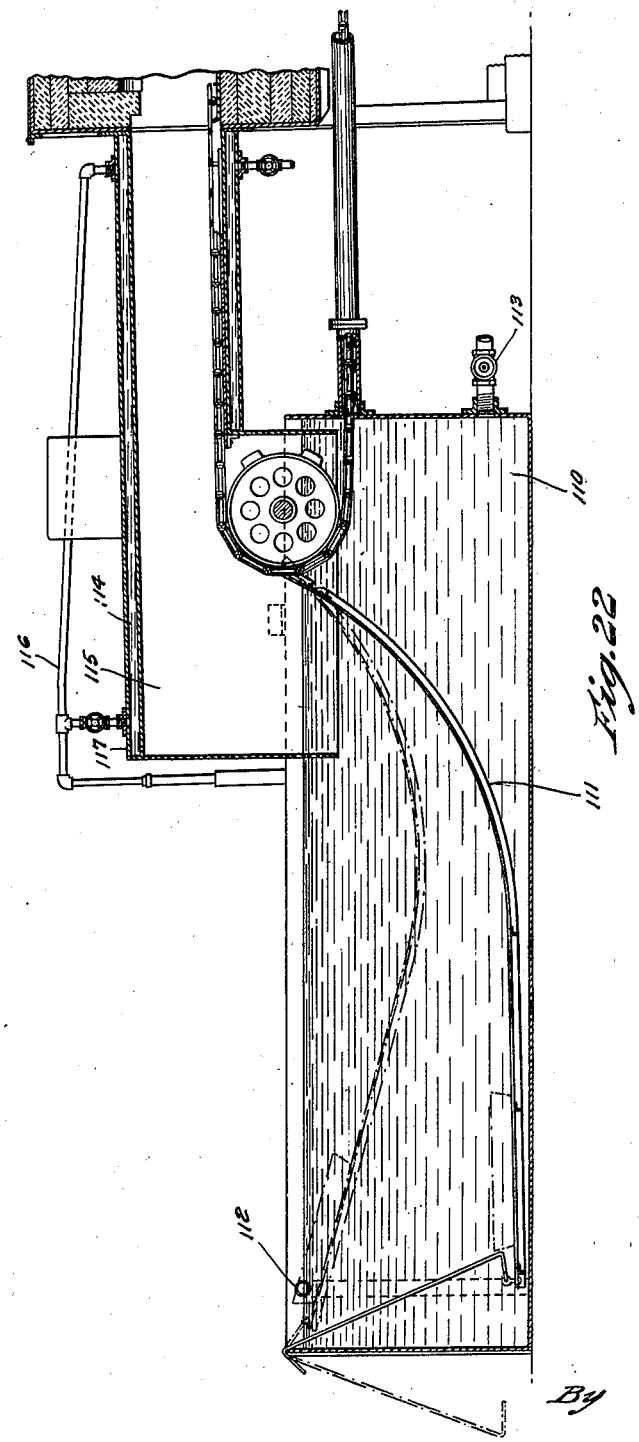

Patented Dec. 7, 1937

2,101,065

UNITED STATES PATENT OFFICE 2,101,065

HEAT TREATMENT FURNACE

Carl I. Hayes, Providence, R. I.

Application March 28, 1935, Serial No. 13,451

7 Claims. (Cl. 263—2)

My present invention relates to furnaces for the heat treatment of metals, and particularly for the heat treatment of silver ware.

The heat treatment of silver ware is best carried out in a hydrogen atmosphere, to prevent surface discoloration. The use of hydrogen gas, however, has certain disadvantages, as there is danger of intake of air until an explosive mixture is present.

It is the principal object of my invention to provide a hydrogen furnace that prevents the intake of atmospheric air to form an air and hydrogen mixture in the heat treating chamber, and that has means for burning any air seepage that may occur.

It is a further object of my invention to provide a construction for better and more accurate control of the heat treatment, and for facilitating the movement of the silver ware through the furnace.

It is an additional object of my invention to provide automatic controls for safe guarding the heating operation and the movement of the material.

With the above and other objects and advantageous features in view, my invention consists of a novel method and a novel arrangement of parts more fully disclosed in the detailed description following, in conjunction with the accompanying drawings, and more specifically defined in the appended claims.

Fig. 1 is a side elevation of the air cooled model showing the general layout of same.

Fig. 2 is an enlarged longitudinal sectional detail showing the heat chamber and also the toggle door mechanism.

Fig. 3 is an enlarged view showing the toggle door operating mechanism, parts being broken away;

Fig. 5 is cross-sectional view looking down on the air cooling chamber;

Fig. 6 is a detailed view showing the automatic stop motion mechanism at the end of the air cooling chamber;

Fig. 7 is a perspective detailed view, partly in section showing the wire for burning off oxygen present at the beginning;

Fig. 8 is a diagrammatical view showing the wire connections;

Fig. 9 is a detailed perspective view showing the means by which the door can open in case of an explosion, permitting emergency opening of the door in case of explosion;

Figure 4:
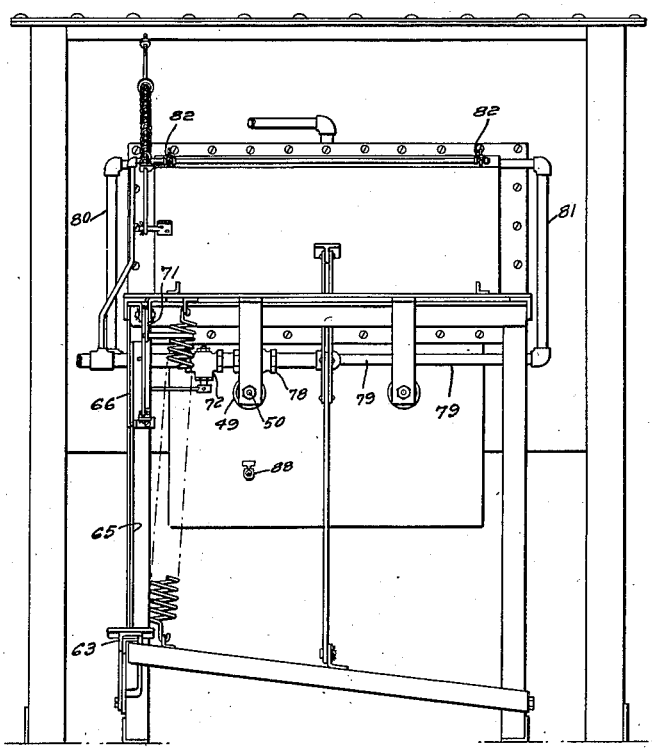
Fig. 4 is a front elevation of the same.
Figure 16:
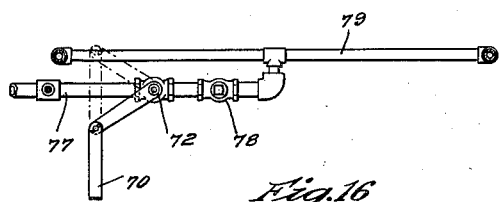
Figure 18:
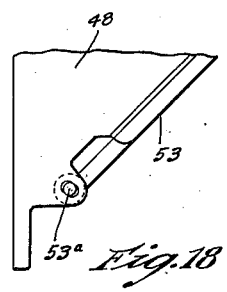
Figure 17:
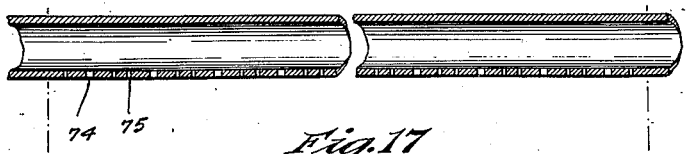

Figs. 10 to 15 inclusive, show the means of locking the open operating foot pedal in position, either open or closed;

Fig. 16 is a detailed view of the gas supply control;

Fig. 17 is a sectional view showing the construction of the curtain burner;

Fig. 18 is a detailed view showing the motion mounting of the door;

Fig. 19 is a detailed view showing the formation of the continuous curtain sheet;

Fig. 20 is a sectional view of a modified furnace construction using water cooling;

Fig. 21 is a detailed view of the automatic stop mechanism for the water cooling modification; and Fig. 22 is an enlarged vertical section showing the water cooling exit trap arrangement and alternate positions for the material receiving rack.

The heat treatment of silver ware is dependent on whether the silver ware is of the hollow or solid type. The hollow ware type is heat treated at a temperature of approximately 1600° F., and is air cooled to provide a relatively slow cooling and better hardness without warping; the solid silver ware is preferably quenched to obtain a softer annealing. In either case, the atmosphere is preferably hydrogen, and it is advisable to provide safeguards against accidental explosion and against mechanical difficulties associated with a conveyor mechanism, and to facilitate inward and outward movement of the work.

Referring to the drawings, Figs. 1 to 21 disclose the invention as applied to an air cooling construction suitable for silver hollow ware and for thin silver articles, and Fig. 22 shows the invention as applied to a water cooling construction for heavy, relatively solid articles.

The heat treatment furnace 30, see Fig. 1, includes a heat treatment chamber 31 and an air cooling chamber 32, the heat treating chamber being supplied with an atmosphere of hydrogen gas from a valve controlled hydrogen tank 33, the chamber having a plurality of electrical heating elements 34 housed in wall recesses 35 for obtaining regulated, controlled heat.

Adjacent the heating chamber and in aligned communication therewith is the air cooling chamber 32, which includes a plurality of sections 36, 37 cooled by means of cooling water jackets which may be in series flow, but preferably have independent flow connections, the cooling water jacket 38 for section 37, which is adjacent the heat treatment chamber, being larger to obtain good flow, and having a valve controlled equalizer bleeder 39, and the cooling water jacket 40 having a valve controlled equalizer bleeder 41, the bleeders being inclined upwardly to prevent formation of air pockets. The water jacket 40 preferably has gravity flow.

The material to be heat treated is moved through the furnace by means of a conveyor chain 42, see Fig. 1, mounted on two aligned gear wheels 43, 44, the rear gear wheel 44 being power driven, and the front gear wheel 43 being on a horizontal support 45 mounted for sliding movement on a horizontal shelf 46, the support 45 having a rod 47 extending through the front wall of the inlet chamber 48 and spring connected by means of a spring 49 and an adjustable rod 50 to a fixed support 51, whereby the slack of the conveyor chain may be adjustably controlled.

The inlet chamber 48 has an entrance chamber 52, with a spring toggle controlled door 53, the toggle levers 54, 55 being controlled by means of links 56, 57, 58, and a treadle V-frame 59 hinged to the frame at one end, a spring 60 normally holding the treadle frame upwardly. The frame has an upright guide pin 61 extending through an opening 62 in a foot treadle 63, also hinged to the frame at the rear end and adapted to telescope over one side of the frame 59. A tensioning spring rod 64 is secured to the door, see Fig. 3, and normally assists in locking the toggle; the door pivot 53 having a little play, see Fig. 18, to facilitate tight closure.

An upright control rod 65 is attached to the treadle 63, and reciprocates in a housing 66 having a slotted wall 67, the slot including two steps 68, 69. A horizontal slotted bar 70, see Fig. 14, is movable through the slot steps 68, 69 by means of a hand control lever 71 and a connecting link 72 to lock the door against opening by the foot treadle, for a purpose hereinafter described. The bar 70 has a through slot 73 and a step slot 74, whereby the rod 65 may run downwardly in one position of the bar 70, see Fig. 11, but has a slot 71, see Figs. 13, 15 which is entered by the bar 70 to lock the rod against movement in any other positions of the bar 70. The construction and control of the rear door is the same as the front door.

As best seen in Fig. 3, one end of the bar 70 is link-connected to a valve nipple 72, which controls flow of auxiliary gas, preferably hydrogen, to a curtain conduit 73, see Fig. 2, positioned at the upper rear end of the entrance chamber 52, this conduit having a plurality of large openings 74 and smaller openings 75 in its lower wall to produce an atmosphere excluding curtain 76, see Fig. 19. The gas is preferably fed in double flow from a conduit 77 through the valve nipple 72, and through a set valve nipple 78 to a conduit 79 which has connections 80, 81 to the ends of the curtain conduit, thus equalizing the flow of the curtain gas. A pilot light connection 82, see Fig. 2 is provided to produce ignition of the hydrogen gas upon opening of the furnace door.

Referring now to Fig. 2, it will be noted that a water jacket 83 is provided adjacent the entrance to the heat treating chamber, and that the lower portion of the conveyor chain passes through a water filled tube 84; the water enters at the inlet 85, see Fig. 1, and overflows at 86, petcocks 87 at the rear and 88 at the front indicating that the tube 84 is completely filled when starting heat treatment. A roller 89, see Fig. 2, at each end, facilitates passage of the silver laden trays onto and from the conveyer. The conveyer chain is preferably passed over channel tracks which straddle the heating units on the floor of the heat treating chamber.

The work is inserted by feeding the trays through the inlet door and onto the conveyer chain, which slowly carries it through the heat treating chamber, and then through the cooling chamber; as the tray nears the exit end, it trips a lever 90, see Fig. 6, mounted on a cross rod 91, which in turn shifts a spring tensioned link 92, see Fig. 21, to release contact switch 93 and thus stop the conveyer current feed to the motor for the change speed gear box 94.

It will be noted that the conveyer is chain driven from the gear box by a sprocket 95, chain 96 and sprocket 97 connected to the rear conveyer gearing 44, and that two tensioning gears 98, 98 are mounted on spring tensioned bars 99, 100 and normally hold the slack of the chain 95; a rod 101 is secured to the link 92, and slides in a mounting 102 on the bar 99. If the conveyer stops for any reason, as by catching of the tray or the like, the chain 96 tightens, the bar 99 moves out, and the link 92 is shifted to release the switch 93.

Referring now to Figs. 5, 7, 8, a safety device is mounted on the air cooling chamber adjacent the conveyer track, comprising a housing 103 having a slot 104, and carrying a series of spaced insulators 105 drilled to accommodate a heating wire 106 and a return wire 107, these being connected in the power circuit to heat the wire 106, whereby any air which seeps into the chamber is burned, thus preventing the formation of an explosive mixture in the furnace.

Referring now to Fig. 22, the general arrangement of the heating chamber, conveyer, and other parts are the same; the air cooling chamber, however, is replaced by a water quenching chamber. Thus, the work is carried past the conveyer into a water tank 110 and onto a curved slide 111, which is hinged at the upper end and normally rests on the bottom of the tank. The trip used in the air cooling modification for stopping the conveyer when the tray reaches the exit end is not needed, as the trays slide into the water tank, which has an overflow 112 and a clean-out 113, and receives the discharge water from the water jacket 114 surrounding the exit chamber 115 through the inclined connection 116. A valve controlled by-pass 117 may be used to increase flow and in the initial preparation of the furnace for use. A bent rod 118 is attached to the slide 111 to function as a lift rod for unloading, and to lock the slide in unloading position.

It is thus evident that inflow of air to the furnace is stopped by the gas curtain, and that any air which seeps into the furnace is burned by the heated igniting wire before an explosive mixture can be formed; if an explosion does occur, the arrangement of the parts controlling the door opening and closing permits the door to fly open even tho the treadle is in locked position.

While I have described specific constructional embodiments of my invention, it is obvious that desired changes in the construction of the parts, their size, relative arrangement, and function, may be made to suit the requirements for different installations, and for the heat treatment of different materials, and that the curtain gases and the enveloping gases may be changed to any suitable gases, without departing from the spirit and the scope of the invention as defined in the appended claims.

I claim:
1. In a heat treatment furnace, a heat treatment chamber, a cooling chamber communicating therewith, means for enveloping work in said chambers in an atmosphere of inflammable gas, and means comprising igniting material positioned in the base of the cooling chamber and contacted by said atmosphere for preventing formation of an explosive mixture in said furnace.

2. In a heat treatment furnace, a heat treatment chamber, cooling chamber communicating therewith, means for enveloping work in said chambers in an atmosphere of inflammable gas, means for cooling the heat treated work, and means comprising igniting wire positioned in the base of the cooling chamber and contacted by said atmosphere for preventing formation of an explosive mixture in said furnace.

3. In the heat treatment of materials, the steps of heating material in a heat treatment chamber and cooling said material in an atmosphere of inflammable gas and igniting a mixture of inflammable gas atmosphere and atmospheric air seeping into said cooling chamber to prevent formation of an explosive mixture with said atmosphere.

4. In the heat treatment of materials, the steps of heating material in a heat treatment chamber and cooling said material in an atmosphere of inflammable gas, utilizing additional gas to prevent contact of air with said inflammable gas, and igniting a mixture of inflammable gas atmosphere and atmospheric air seeping into said cooling chamber to prevent formation of an explosive mixture.

5. In the heat treatment of materials, the steps of heating material in a heat treatment chamber and cooling said material in an atmosphere of inflammable gas, utilizing additional inflammable gas to prevent contact of air with said inflammable gas, and igniting a mixture of inflammable gas atmosphere and atmospheric air seeping into said cooling chamber to prevent formation of an explosive mixture.

6. In a heat treatment furnace, a heat treatment chamber, a cooling chamber communicating therewith, means for heating said heat treatment chamber, means for filling said chambers with inflammable gas, a heating element in the base of said cooling chamber exposed to said inflammable gas, and means for heating said element.

7. In a heat treatment furnace, a heat treatment chamber, a cooling chamber communicating therewith, means for heating said heat treatment chamber, means for filling said chambers with inflammable gas, an igniting wire in the base of said cooling chamber exposed to said inflammable gas, and means for heating said wire.

CARL I. HAYES.